July 16, 1940.   S. K. WELLMAN   2,207,961
CUSHIONED FRICTION CLUTCH
Filed Sept. 29, 1939
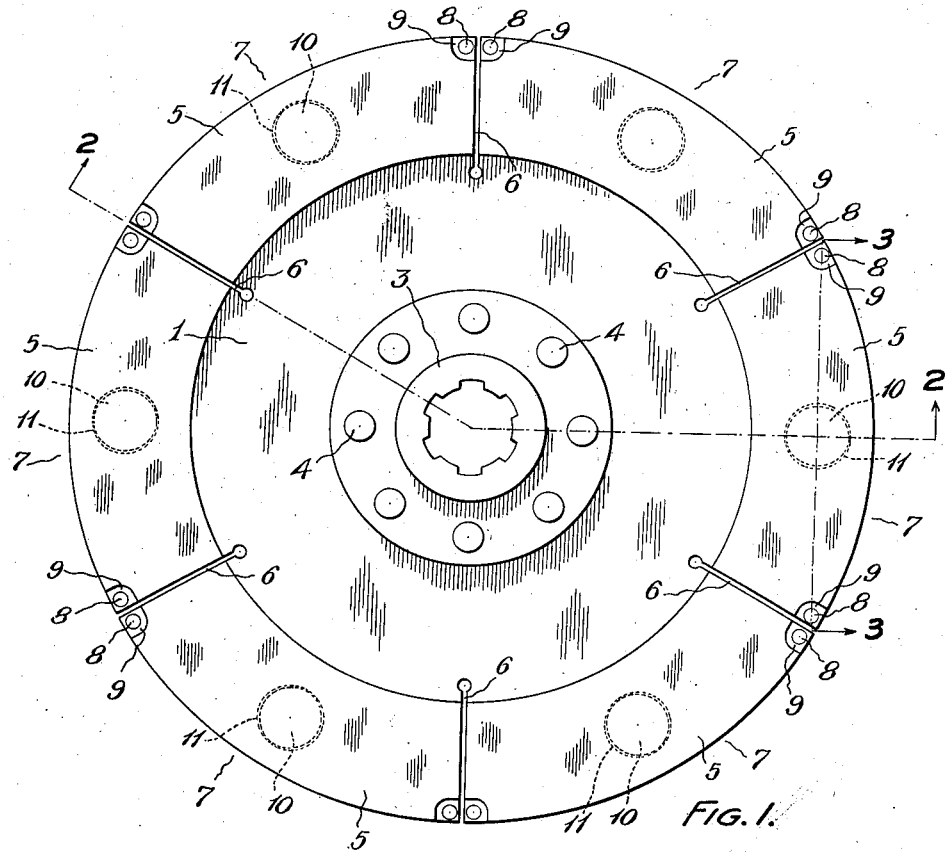
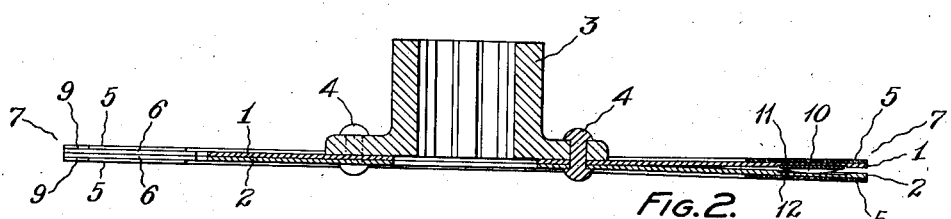
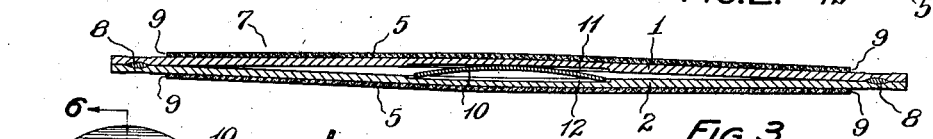
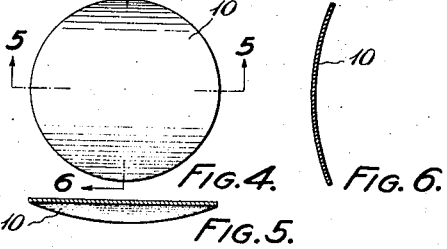
INVENTOR:
SAMUEL K. WELLMAN
BY G. G. Christensen
ATTORNEY Patented July 16, 1940

2,207,961

UNITED STATES PATENT OFFICE 2,207,961

CUSHIONED FRICTION CLUTCH

Samuel K. Wellman, Cleveland Heights, Ohio, assignor to The S. K. Wellman Company, Cleveland, Ohio, a corporation of Ohio Application September 29, 1939, Serial No. 297,065

5 Claims. (Cl. 192—107)

This invention relates to a cushioned clutch plate for friction clutches of the kind wherein the clutch plate is disposed between a pair of cooperating pressure plates and is adapted to be gripped or clamped therebetween under sufficient pressure to transmit the power supplied to it by the pressure plates. The invention relates particularly to a cushioned clutch plate of the all-metal type which utilizes sintered metal friction facing material.

One object of the invention is to provide a light-weight cushioned clutch plate of the all metal type, and preferably to provide one having longer life and lighter weight than conventional clutch plates faced with non-metallic friction material.

Another object is to provide a cushioned clutch plate, the friction facing material of which may be worn entirely away without danger of the pressure plates being scored or gouged by rivets or like fastening means generally used in securing the facing material to the supporting discs.

Another object is to provide a clutch in which welded joints replace the rivets or other like fastening means generally used in securing the supporting discs to each other.

Another object is to provide a cushioned clutch in which the cushioning members and the welded joints are not relied upon to transmit power between the driving and driven parts of the clutch.

Other objects will appear in the following description taken in connection with the accompanying drawing, in which:

Fig. 1 is a plan view of a clutch plate embodying the invention.

Fig. 2 is a sectional view of the clutch plate taken on line 2—2 of Fig. 1.

Fig. 3 is an enlarged sectional view taken on the line 3—3 of Fig. 1.

Fig. 4 is an enlarged plan view of a preferred form of cushion element.

Fig. 5 is a longitudinal sectional view of the cushion element taken on line 5—5 of Fig. 4.

Fig. 6 is a transverse sectional view of the element taken on line 6—6 of Fig. 4.

A clutch plate as constructed in accordance with this invention consists of a pair of relatively thin discs 1 and 2 placed flatwise together with their centers in axial alignment. The discs are secured to any suitable hub 3 preferably by means of rivets 4, 4. The outer faces of the discs have thin layers of sintered-metal friction facing material 5, 5 alloy-bonded thereto adjacent their peripheries. Any suitable sintered metal friction material may be used, but a material composed predominantly of copper and containing small amounts of lead, tin, iron, graphite and silica is preferred. Such a composition is described in my copending application Serial No. 210,651 filed May 28, 1938, in connection with a method for alloy-bonding it to metal backing members. It will be understood that various methods for producing such an integral bond are suitable, but the method described in the above mentioned application is preferred since the bond produced by that method is exceptionally strong and in addition is very resistant to temperature, permitting a clutch of the type there described to be operated for prolonged periods of time at temperatures approaching 1000° F.

The discs 1 and 2 are preferably slotted as shown at 6, 6 to provide greater peripheral flexibility in both axial and circumferential directions, but it will be apparent that the slots may be omitted without altering the basic features of the invention. When slots are provided, the peripheries of the discs are divided into a plurality of registering segments designated generally by the reference character 7. The end portions of each pair of registering segments are welded together in such manner that the welded metal lies below the outer faces of the discs 1 and 2. Autogenous spot-welds are shown at 8, 8, the friction facing material 5, 5 having been removed in the areas 9, 9 to facilitate the formation of a sound weld between the discs, and to avoid the formation during welding of any areas of friction material which might have different friction properties than exist in the balance of the facing.

Cushioning is provided between the faced discs in order to give a smooth clutch action and avoid chattering, grabbing or jerking when the clutch is engaged. Cushioning is accomplished by inserting a bent sheet metal spring 10 between each pair of registering segments, the spring being inserted intermediate the welded ends of the segments, and preferably about midway between them. The spring element is designed to have sufficient strength normally to force the segments apart a limited distance, in the manner shown in Fig. 3. However, the springs are not so strong as to prevent the faced segments from being forced into contact with each other when the clutch plate has been gripped between the co-operating pressure plates.

In order to permit the segments to be squeezed flat against each other, the spring element is disposed in clearance recesses 11 and 12 provided on the inner faces on discs 1 and 2 respectively, the recess in the face of each segment being disposed to register with the recess in the abutting segment. The registering recesses have a combined depth which permits the spring to be wholly received within them when it has been flattened. One or both of the recesses should be provided with side and end walls which will be effective in constraining the spring element against lateral displacement.

A preferred form of spring element is shown in Figs. 4 thru 6. It consists of an arcuately curved disc of thin sheet metal, its curvature being preferably cylindrical. When a spring element of this kind is used, the recesses 11 and 12 in which it is positioned may be formed by counter-boring the discs 1 and 2. It has been found that the recesses may be quite shallow since a chrome-vanadium steel disc 0.75" in diameter and .018" thick has sufficient strength to bow the segments apart a distance of about .020" at a point midway between welds when the welds are spaced 5" apart and when the two friction discs consists of annealed sheet steel .030" thick having a layer of sintered-copper friction material .020" thick and 1.5" wide alloy-bonded to one surface of of each. A clutch plate having six pair of registering segments with one of the above springs between each pair will be squeezed flat when an axial load of about 300 pounds is applied to the pressure plates of the clutch.

It will be observed that a clutch plate constructed in accordance with this invention, altho using a thin facing layer of friction material, is capable of long service since the whole thickness of friction material may be worn away. That is, since no rivets or other fastening means extend thru the friction layers, the entire thickness is available for service. Furthermore, by reason of the fact that long life may be obtained from such a thin layer, a light-weight clutch plate may be provided even though metallic friction material of relatively high density is used. Moreover, since the cushioning structure employs a minimum number of parts and each part is of light weight, the advantages of cushioning may be obtained without adding to the weight of the assembly. It will also be observed that since each layer of friction material is rigidly coupled to the hub member thru its own individual supporting disc, the cushion elements and the welded joints are not relied upon to transmit any torsional forces. Lighter construction may therefore be used in these parts with a concurrent gain in simplicity of design and in ease of fabrication and assembly. It will therefore be recognized that the invention involves a number of interrelated features which mutually cooperate to provide a clutch plate embodying advantages not heretofore available in clutch plates of the all-metal type.

Having now explained my invention, what I claim is:

1. A clutch plate comprising a pair of relatively thin sheet metal discs having inner and outer faces and disposed in axial alignment with their inner faces together, said discs being welded together adjacent their peripheries at a plurality of areas spaced apart circumferentially, the portions of said discs intermediate said welded areas being adapted to be flexed outwardly out of their plane, sintered-metal friction material alloy-bonded to the outer faces of said discs, the inner faces being provided with a plurality of recesses therein each bounded by side and end walls, the recesses of one disc being disposed in spaced relation to the welded areas thereof and adapted to register with similarly disposed recesses in the abutting disc, a thin sheet metal spring disposed in each pair of registering recesses and constrained against lateral displacement by the side and end walls thereof, said spring being effective in resiliently impelling the flexible portions of said discs apart and adapted to be wholly receivable within said pair of registering recesses when said discs are pressed together to bring their inner faces into mutual contact.

2. A clutch plate as claimed in claim 1 wherein each pair of registering recesses is disposed approximately midway between adjacent welded areas, and are flat-bottomed and cylindrical, and wherein said springs are cylindrically curved discs each having a diameter slightly less than the diameter of the recesses in which it is positioned.

3. A clutch plate comprising a pair of relatively thin sheet metal driving discs having inner and outer faces and disposed in axial alignment with their inner faces together, said discs being divided circumferentially into an equal number of registering segments by slots extending radially inwardly from the circumference, the outer face of each segment having sintered metal friction material alloy-bonded thereto, and the inner face thereof having a recess therein defined by side and end walls, the recess in each segment being disposed to register with the recess of the opposed registering segment, a thin sheet metal spring disposed in each pair of registering recesses and constrained against lateral displacement by said side and end walls, the spring being adapted normally to resiliently impell said registering segments apart and being wholly receivable within the opposed registering recesses when said segments are pressed together to bring their inner faces into mutual contact, said discs being secured at their central portions to a hub member, and welded together in the radial marginal portions of each segment.

4. A clutch plate as claimed in claim 3, wherein said opposed registering recesses are disposed approximately midway between the ends of registering segments, and near the outer periphery of the discs.

5. A clutch plate as claimed in claim 3, wherein said recesses are flat-bottomed and cylindrical, and wherein said springs are cylindrically-curved discs, the diameter of each recess being slightly greater than the diameter of the spring disposed therein.

SAMUEL K. WELLMAN.